United States Patent [19]
Elliott

[11] 3,776,038
[45] Dec. 4, 1973

[54] VISUAL-TYPE HYGROMETER
[76] Inventor: Stanley B. Elliott, 7125 Conelly Blvd., Bedford, Ohio
[22] Filed: Apr. 6, 1972
[21] Appl. No.: 241,573

Related U.S. Application Data
[63] Continuation-in-part of Ser. No. 18,921, March 12, 1970, abandoned.

[52] U.S. Cl. .................................. 73/335, 73/29
[51] Int. Cl. ........................................ G01n 19/10
[58] Field of Search................... 73/335, 336.5, 29; 350/157, 158; 116/114 AM

[56] References Cited
UNITED STATES PATENTS
3,168,829  2/1965  Nelson................................ 73/336.5
2,597,589  5/1952  Matthias............................. 350/157

OTHER PUBLICATIONS
Physics by Hausmann and Slack; pages 706–708; copyright 1935, 1939.
Manufacturing Optician; Vol. 17, No. 6; March 1964 pages 268–270.

Primary Examiner—Richard C. Queisser
Assistant Examiner—Denis E. Corr
Attorney—George S. Baldwin et al.

[57] ABSTRACT

A visual type hygrometer including (1) a source of illumination that provides a light beam, (2) means for providing observable changes in relative humidity which is a chemical composition such as the sodium salt of 1,1' binaphthyl 8-8' dicarboxylic acid that of itself senses changes in relative humidity by being abruptly triggered at a predetermined relative humidity, and (3) light detecting means for detecting observable changes in the brightness and intensity of the light coming from the composition when the light beam contacts the composition.

49 Claims, 9 Drawing Figures

INVENTOR
STANLEY B. ELLIOTT
Baldwin, Egan, Walling & Fetzer
ATTORNEYS

VISUAL-TYPE HYGROMETER

REFERENCE TO CROSS-RELATED APPLICATION

This application is a continuation-in-part application of my copending application Ser. No. 18,921, filed Mar. 12, 1970, now abandoned.

This invention is directed to a visual-type hygrometer and a method of measuring relative humidity thereby. It particularly relates to a hydrometer comprising (1) a source of illumination that provides a light beam, (2) means for providing observable changes in relative humidity comprising a chemical composition such as an alkali metal salt of 3,3',4,4'-benzophenone tetracarboxylic dianhydride that of itself senses changes in relative humidity by being abruptly triggered at a desired relative humidity, and (3) means for detecting observable changes in the brightness of the light coming from the composition when the light beam contacts the composition.

The chemical composition that of itself senses the changes in relative humdity is birefringent at a first relative humidity and nonbirefringent at a second relative humidity which can be detected by passing the light beam through a polarizer and passing the polarized beam through the composition to an analyzer. The composition is also translucent at a first relative humidity and clear at a second relative humidity and the abrupt observable change in light coming from a light beam that contacts the composition due to a change in relative humidity is readily observed by the eye or a device such as a photocell.

The light detecting means can be electrical means responsive to observable changes in the brightness and intensity of the light coming from the chemical composition, the light coming from the composition at the first relative humidity being of sufficient brightness and intensity to provide a visual signal to activate the light-detecting electrical means.

This invention relates to a type of hygrometer in which changes of relative humidity (R.H.) are indicated visually.

More specifically, in one embodiment, birefringent crystals whose birefringence is sensitive to changes in relatively humidity are displayed between a polarizer and analyzer so that changes in birefringence may be readily observed. By selection of suitable birefringent crystallizable compounds, whose birefringence either begins or terminates at various relative humidities, a series of highly visual displays may be readily assembled to comprise an efficient hygrometer.

There are many accurate hygrometers available whose operation depends on such factors as (1) the change in length of a hair or membrane as the R.H. varies, (2) the ability of a hygroscopic solution film to change its electrical resistance with changes in moisture content (R.H.) of the gas above it, (3) the ability of hygroscopic polymeric sensor to change its electrical resistance with changes in R.H., and (4) the ability of a hygroscopic aluminum oxide film to change its eletrical resistance with changes in R.H. There are various types of Psychrometers available, too, and these in general depend on determining the difference between "web-bulb" and "dry-bulb" thermometer readings to indicate the R.H. of the gaseous environment. There are still other types which depend on electrolyzing the water in the gas stream in order to determine its concentration and thus the R.H. Still others depend on cooling the gas to determine its "dew point," a point which may be related to R.H. with suitable tables. However, all these devices are either mechanically complex, require special manipulation in order to get a reading, require external power, or are delicate in nature. Though these limitations are generally tolerable, there is an acute need for what might be termed a "secondary hygrometer," one easily read, rugged, and independent of external power to serve as a warning device in case the complex devices malfunction. For humidity control is vital in an advanced civilization and great damage may occur if it fails.

There exists a simple, visual type of hygrometer based on the fact that certain cobalt compounds change color from blue to red as the humidity rises. This device is widely used of necessity. But it is very difficult to judge R.H. with any precision using this technique because of the subtle color shifts. Further, the change is of an unobtrusive nature and thus unsuitable for serving as a visual alarm.

Years of research have been devoted to improving cobalt compounds and their complexes as humidity indicators. But in spite of this it has been noted in the National Bureau of Standards sponsored series, "Humidity and Moisture — Measurement and Control in Science and Industry," Vol. I, p. 604, referring to cobalt chloride RH-indicators, "As regards the reading of the indicator, we again note that when the humidity is below the stated calibration of the particular spot we are observing, the spot will be a distinct blue. When the humidity is higher than this calibration, the spot will be a distinct pink. The bluer the color, the drier is the air, and vice versa."

"It takes about a 10 percent range for any spot to turn from a distinct blue to a distinct pink (in between it is lavender)." The difficuly of identifying any particular shade of lavender as characterizing a particular humidity has resulted in the use of such techniques as printed color comparison panels. But printing exactly controlled shades of lavender is very, very difficult. In an effort to minimize the resulting errors, spectophotometers or certain types of spectrally responsive photocells, with or without filters, have been used. But these are methods of using complex devices in order to obtain a varying signal level representing a very slowly shifting blue/red color ratio. A certain signal level may, ostensibly, represent a particular RH, but is is subject to all of the inaccuracies present due to equipment drift when measuring a slowly shifting parameter when no convenient fixed standardization point is available.

Unlike the slow color shift just described, the present invention involves compounds characterized by an abrupt shift from clear to translucent (or vice versa) if viewed directly by the eye or from blue-black to white (or vice versa) if examined by the use of polarized light as the ambient RH changes suitable. Importantly, with the first of the two basic types of compounds which will be described, the appearance change from the clear (no or low hydration solid) to the translucent (hydrated or higher hydration solid) state is basically a "go-no go" process. For it is fundamental to the nature of hydrate formation that no hydrate forms until the critical vapor pressure (RH) at which the hydrate is stable is reached. At this critical pressure all the salt then converts to the hydrate. The same mechanism operates when the salt is dehydrating.

The same "go-no go" shift occurs in the case of the second of the two basic types of compounds. These compounds abruptly pass from translucent (solid) to clear (liquid). For only when the partial pressure of water vapor in the air exceeds the vapor pressure which is saturated solution of the salt would exert, does the salt dissolve. But at that point the salt will totally dissolve. Electrical devices such as photocells which would be actuated by the shift in light level accompanying these abrupt changes in structure operate in a precisely repetitive way since the shift point is inherent in the structure selected.

Accordingly, one of the object of the present invention is to provide a visual-type hygrometer in which a number of delineated areas change sequentially from blue-black to brilliant white (or vice versa) as the R.H. rises.

Still another object of the invention is to provide a visual humidity alarm in which a relatively large area changes from blue-black to brilliant white (or vice versa) as the humidity varies from some desired range. In such a device suitable warning legends may appear to the viewer after the humidity has deviated from the desired range.

Another object of the invention is to provide a visual means of determining gas flow patterns in ducts, hoods, etc. by allowing suitably humidified gas to impinge on R.H.-sensitive birefringent crystals deposited on a substrate sandwiched between a perforated, spatially separated, polarizer and analyzer.

Another object of the invention is to provide a special type of hygrometer which can be used as a visual-type thermometer. Delineated areas, for example, may change sequentially from blue-black to brilliant white (or vice versa) as the R.H. falls (in response to a temperature rise) in a sealed system having a selected absolute moisture content.

As a variant of this, if an R.H.-sensitive compound which is birefringent at high humidities but non-refringent at lower humidities, is deposited on a suitable substrate and this is sealed into a double-pane window of the type used for insulating purposes, and the whole placed between crossed polarizers, a temperature-sensitive system is obtained. When an appropriate absolute moisture content is sealed in, if direct sunlight falls onto the system the temperature rises, the R.H. drops sufficiently, birefringence ceases, and the system no longer transmits appreciable light.

Another object of the invention is to provide a visual-type moisture tester in which delineated areas change sequentially from blue-black to brilliant white (or vice versa) to indicate the R.H. of the system and thus, secondarily, the moisture content of the material being tested, as paper, tobacco or wood.

Additional objects and advantages of the visual-type hygrometer of the present invention will be apparent to one skilled in the art to which it pertains and upon reference to the following disclosure of several preferred embodiments thereof, and which are illustrated in the accompanying drawings, in which.

Figure 1:
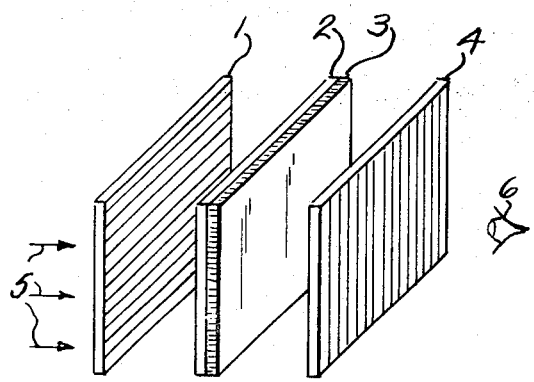
FIG. 1 is a view of a typical transmission-type system.

In a representative embodiment of the visual-type hygrometer of the present invention shown in FIG. 1, a light beam from light source 5 which may be a window, a tungsten lamp, a fluorescent lamp, etc. passes through Polaroid polarizer 1 where the light beam is polarized. The beam then passes through transparent or translucent substrate 2 which may be glass or some isotropic plastic such as cellulose triacetate, on which is deposited crystal layer 3. The beam passing through 2 and 3 then encounters Polaroid analyzer 4 whose polarizing axis is usually at right angles to the polarizing axis of 1 so as to result in what is generally termed a "dark field."

If the coating 3 on substrate 2 is in its non-birefringent mode, little light passes through analyzer 4 and the system appears "dark field" to viewer 6. However, if the humidity changes sufficiently, coating 3 becomes birefringent. When a light beam enters a birefringent or, as it is sometimes called, double refracting material, it is divided into two components, one defined as an extraordinary ray and the other as an ordinary ray, each vibrating in a direction at right angles to the other and traversing the birefringent material with a different velocity to thereby introduce a phase difference therebetween. As said beam is thereby resolved into two components, one of which is retarded with respect to the other, said beam is generally referred to as being elliptically polarized. The two components emerging from the birefringent material and entering the second sheet of polarizing material 4 are resolved into one plane-polarized beam again. But a phase difference has been introduced between the two parts of this same beam, and so the necessary conditions for interference are present. With a white light source brilliant colors will emerge from analyzer 4 if the coating 3 crystalizes in large crystals. If the crystals are very small there is a mixing of colors and the crystal mass appears white. But in either case the field which was previously a blue-black passing very little light now glows brilliantly.

Figure 2:
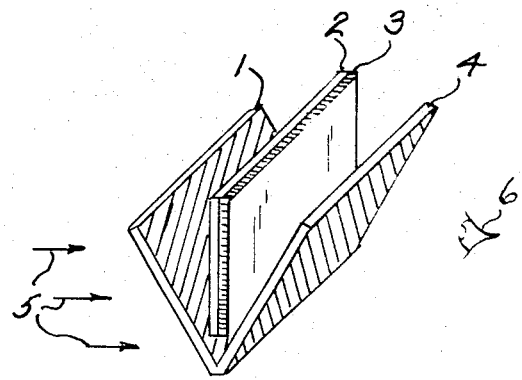
FIG. 2 is a view of a transmission-type system using a single piece of polarizing material.

FIG. 2 is essentially the same as FIG. 1 but better adapted to mass production in that a single piece of polarizing material is folded at 45° to its polarizing axis. This forms two leaves 1 and 4 whose polarizing axes are at right angles to one another and so create a "dark field" condition when the viewer 6 interposes the folded layers between him and light source 5. A substrate 2 coacted with R.H.-sensitive layer 3 is then inserted to create a R.H.-responsive sandwich. Or, if desired, the layer 3 may be coated on one or both inner surfaces of 1 and 4 so as to eliminate the need for a separate substrate.

Figure 3:
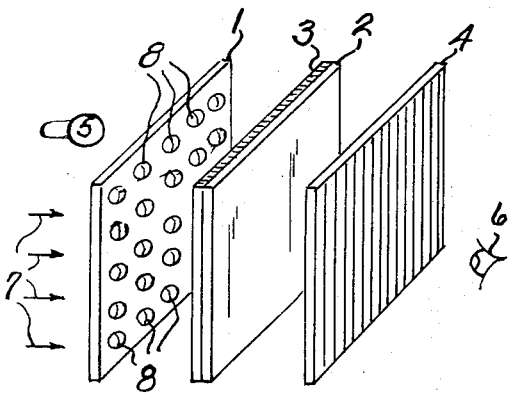
FIG. 3 is a view of a transmission-type system designed to most efficiently check the R.H. of a gas stream normal to the polarizer and analyzer.

FIG. 3 typifies a transmission-type system useful for checking the humidity (and uniformity of moisture and/or air distribution) of air emerging from ducts. Air stream 7 passes through apertures 8 pierced in Polaroid polarizer 1 illuminated by lamp 5. The air stream then encounters R.H.-sensitive layer 3 coated onto substrate 2. Viewer 6 scans the system through analyzer 4 to determine uniformity of birefringence.

Figure 4:
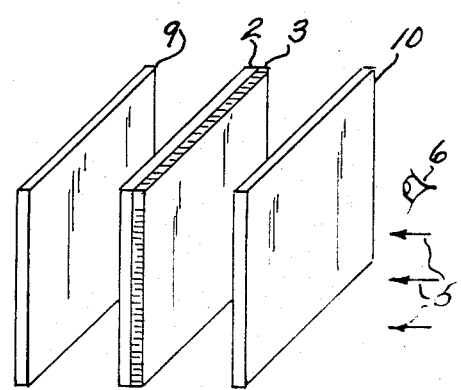
FIG. 4 is a view of a typical reflection-type system.

FIG. 4 typifies a reflection-type system in which light beams from a source 5 pass through polarizer 10 where they are polarized. They then pass through the R.H.-sensitive layer 3 coated on substrate 2 to the polarization-conserving mirror 9. The mirror reflects the beam back through the Polaroid 10 which now serves an an analyzer. As a variant of this system a circular polarizer may be used for 10 in place of the usual linear polarizer. Then, when the coacting 3 is non-birefringent, no light will be reflected back through 10 because the circular polarizer has polarized the beam to a "right-handed" or "left-handed" helix form which cannot pass back through the circular polarizer 10. When coating 3 becomes birefringent, the polarization form of the light that is reflected from the mirror is altered and the returning light passes through the polarizer 10.

The hygrometers described may be used as "moisture meters" as well by simply taking care to enclose the hygrometer with the hygroscopic material whose moisture content is to be measured so that the salts may come to equilibrium with the atmosphere over the hygroscopic materials. Thus, a hygrometer may simply be buried in a product such as a grain and allowed to remain there long enough to equilibrate with the grain. In other cases, the product whose moisture content is to be tested is temporarily sealed into a container with the hygrometer until equilibrium is reached. In each case, of course, a chart must be prepared for the particular product relating R.H. over the product to the moisture contained in the product at that R.H. This chart is then consulted, knowing the R.H. reading, to determine the product's moisture content.

Figure 5:
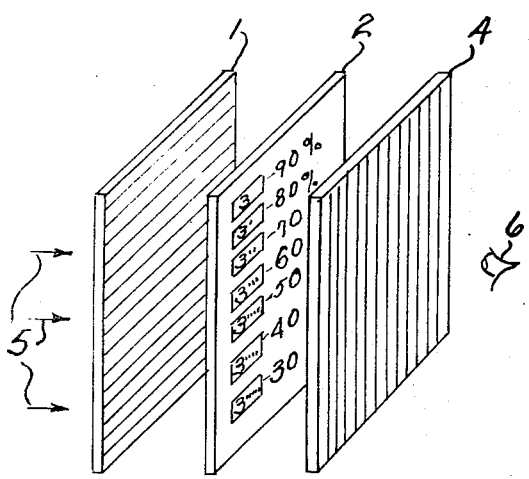
FIG. 5 is a view of a typical transmission-type system using sequential R.H. series placques.
Figure 6:
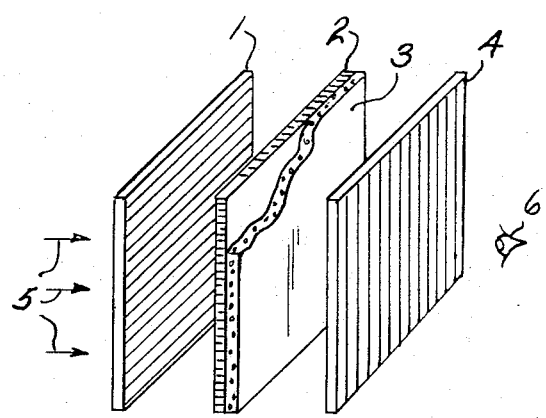
FIG. 6 illustrates another embodiment of typical transmission type such as shown in FIG. 1.

The substrate on which the R.H.-sensitive layer is deposited may be of a smooth material such as isotropic glass if the device is to be operated in the horizontal plane. However, when the device is vertical, the R.H.-sensitive layer, when it is in the liquid condition, may drain to the bottom of the plate under the influence of gravity. Under such circumstances, since roughening of the surface generally allows the solutions used to wet the substrate more thoroughly, placques may be sandblasted or etched into the substrate, to give anchorage to the solutions and prevent their moving downwardly across the poorly wetting smooth surface. Such a unit is shown in FIG. 5 where the coatings, 3, 3', 3'', etc. are applied to etched areas on substrate 2.

To further control drainage problems the solutions of R.H.-sensitive compounds may be deposited in quite small areas, of circular shape, for example, either on smooth or etched spots on the substrate. These "droplets" may be "printed" onto the surface, for example, or they may be deposited by spraying through apertures in a mask over the substrate. The droplets of solution, analogous to the dots which comprise "half-tone" pictures, may be arrangd to form placques, R.H. legends, warnings, etc.

Other methods may be used to create effective visual presentations of the R.H.-sensitive salt layers. Thus, very small glass beads of the type used in manufacturing reflective signs may be cemented to a substrate with a suitable cement, as for example an epoxy. The beads are spaced closely and insufficient adhesive is used to fill the interstices. Thus, a large number of small cavities are formed between the beads. R.H.-senstitive salt solutions may be deposited in these cavities to form visually effective displays as water evaporates and crystallization occurs.

R.H-senstiive salt solutions may also be deposited in narrow channels or holes engraved into such substrates as transparent acrylic polymers. Such channels serve to hold the salt in its liquid form yet make effective displays when moisture has evaporated and birefringent crystals have formed. The channels may form numbers indicating the particular R.H. range of the salt filling the channels or may form rectangular display panels, etc.

The olutions of R.H.-sensitive compounds are desirably compounded with non-hygroscopic wetting agents to lower their surface tension so that they wet the chosen substrate. Since salts or other polar compounds are often selected for used as R.H.-sensitive compounds, the wetting agents are most suitably of a non-ionic form. Further, so as to secure effective but controlled wetting of the substrate, sufficient wetting agent is desirably compounded into the solution to obtain a surface tension near but not below the Critical Surface Tension of the substrate. That way a small contact angle is secured but wetting does not proceed spontaneously across the entire surface so as to cause drainage problems due to gravity.

Though generally good wetting is desired, in special cases poor wetting may be advantageous to create warning devices. Thus, a solution of an R.H.-sensitive compound having a naturally high surface tension may be sprayed onto a substrate in such a concentrated form that it dries almost immediately at the temperature and/or R.H. present under spraying conditions. This R.H.-sensitive film on its carrier substrate may then be displayed in typical transmission- or reflection-type hygrometers where an evenly illuminated, birefringent surface is maintained so long as the R.H. remains below the critical point typical of the particular compound. Above the critical R.H., the hygroscopicity of the film removes moisture from the air and the birefringent crystals dissolve. The high surface tension of the solution then causes it to pull together into droplets. Thus, even if the dangerously high R.H. is subsequently lowered, a simple visual inspection of the film will reveal by the presence of droplets that the danger point was indeed passed. This type of signal is especially important, for example, in the storage of packaged equipment outdoors in the tropics where wide temperature variations can bring wide R.H. fluctuations inside the sealed package. Near the end of the life of enclosed dehydrating agents such as silica gel, the R.H. within the packa e can appear safely low at elevated daytime temperatures but it is actually dangerously high at lower night temperatures. The device just described maintains a round-the-clock watch for dangerously high humidities.

Figure 7:
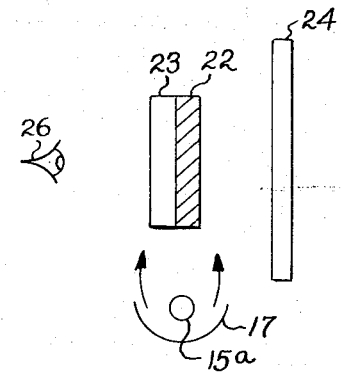
FIG. 7 is a view of a visual-type hygrometer in which the chemical composition itself senses changes in relative humidity by being translucent at a first relative humidity and clear at a second relative humidity. The composition is illuminated from the side and changes in relative humidity are easily observed against a dark field background.

Turning to FIG. 7 in the drswings, it is a view of a visual type hygrometer having a source illumination 15 providing a light beam 15a and a reflector 17 for directing a beam toward a transparent isotropic substrate 22 (similar to substrate 2 in FIG. 1) such as glass on which is deposited chemical composition layer 23 (similar to layer 3 of FIG. 1) that of itself senses changes in relative humidity.

A dark-field backing 24 is provided so that the eye 26 of a viewer sees a dark-field when the chemical composition of layer 23 is iostropic and clear at a second relative humidity. The dark-field lights up when achange of relative humdity abruptly triggers at a predetermined relative humidity from an isotropic and clear state characteristic of the second relative humidity to an anisotropic and translucent transmission state characteristic of a first relative humdity. By using a dark-field backing and side lighting, the light detecting means does not have to include a polarizer and a analyzer. The light detecting means for detecting observable changes in the brightness and the intensity of the light coming from the composition can be the eye of an observer or an electrical means responsive to the visual signal at the first relative humidity such as photoresponsive solid state electronic device including a photocell.

Figure 8:
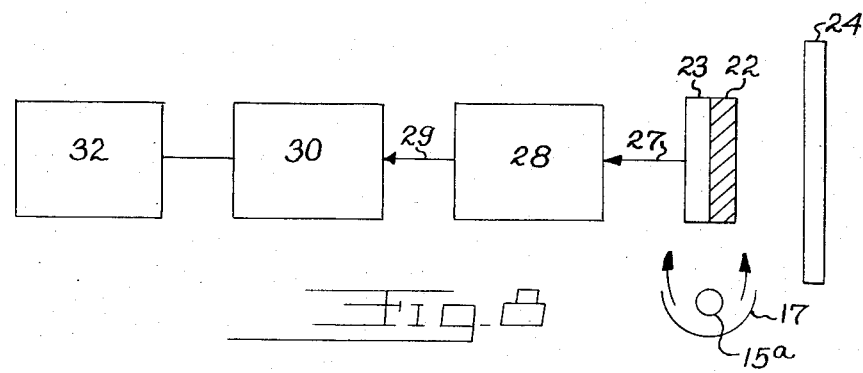
FIG. 8 shows an electrical type hygrometer in which light-detecting electrical means responsive to observable changes in brightness coming from the composition that itself senses changes in relative humidity.

An electrical-type hygrometer is shown in FIG. 8 in which the visual signal indicated by 27 from the chemical composition of layer 23 is picked up by a photoresponsive electrical sensing device 28 such as a photocell, a light activated silicon controlled switch, a planar silicon phototransistor, a planar silicon photodarlington amplifier, or a photo diode. A signal 29 is provided from a device 28 to electrical control means 30 such as a relay which controls electrical power to activate an electric circuit 32.

Figure 9:
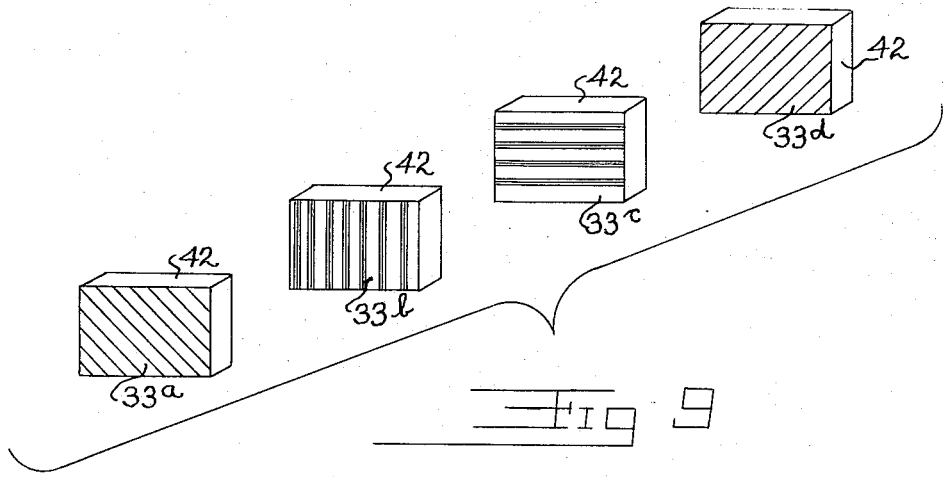
FIG. 9 shows a visual-type hygrometer in which at least two discrete areas are occupied with a series of compositions whose birefringence terminates at different relative humidities.

FIG. 9 shows a visual type hygrometer comprising a series of panels comprising a transparent base 42 with a series of compounds 33a, 33b, 33c and 33d which are optically spaced from each other in parallel planes. The bases have a series of chemical compounds 33a, 33b, 33c and 33d that occupy at least two discrete areas in each panel, the compounds having birefringence that terminates at different relative humidities. The compounds as in the case of FIG. 5, are applied to etched areas of the base or substrate 42.

Compounds that of themselves sense changes in relative humdity may be of the type which pass from a non-birefringent state to a birefringent state as the R.H. rises. One mechanism by which this can happen is believed to involve the formation of unstable hydrates which are birefringent. The birefringent hydrate is stable above a particular R.H. yet converts readily to a non-birefringent material of anhydrous form or of a lower degree of hydration as the R.H. drops below the critical moisture concentration. A good example of such a material is the tetrapotassium salt of 3,3'-4,4' benzophenone tetracarboxylic dianhydride which becomes birefringent at approximately 46% R.H. It continues birefringent until the R.H. rise to the place where deliquescence causes solution of the crystals with abrupt termination of birefringence. This occurs at approximately 65% R.H.

There are two basic types of compounds which are useful as the active agents in temperature- or R.H.-sensitive devices. The first type includes those compounds which are birefringent in the hydrated state but onn-birefringent when anhydrous or when the water of hydration has dropped below a critical point.

There are a large number of compounds which exhibit birefringence when viewed between a polarizer and analyzer. Many of these compounds are hydrated as well. However, most of these materials are impractical for use as R.H. or temperature sensors because the water of hydration is bound so tightly into their structure. Once hydrated formations have been created, as from solution, water may be slowly driven out, but usually only through the use of impractically low humidities and excessively high temperatures. This, unfortunately, usually destroys the mechanical integrity of these tightly organized structures and a powder forms. That is, each crystal unit is so disrupted that it cannot easily be restored to its original coherent birefringent form by simply raising the relative humidity to the original level at which the hydrated material was stable. Thus, such polarized light devices as have been described here have not been feasible.

I have discovered a new class of compounds which make possible such visual sensors. I do not intend to be bound by theory, but it appears that films of such substances are characterized by submicroscopic openness of structure which allows water to readily move in and out of the system. That is, the hydrated, birefringent structure rapidly and easily forms under appropriate conditions, yet the anhydrous or less hydrated non-birefringent form is readily reconstituted when earlier conditions are reestablished.

The materials are the salts of relatively symmetrical compounds characterized by having at least two rings bearing carboxyl, hydroxyl, or sulfonic groups, The rings are joined by a bond or bonds of a type which, it is hypothesized, allow ring rotation around the bond so that bulky, nonplanar structures result. Ordinary planar molecules readily form compact, highly organized structures. However, it is believed that the molecules of this new class of compounds form crystal structures quite open to the passage of water molecules. In particular, these compounds comprise the alkali salts, pure or mixed, of molecules consisting of at least two rings bearing carboxy, hydroxy, or sulfo groups as substituents. The substituents may be on the same or separate rings.

Such groups as —OK, —OORb, and —$SO_3Na$ furnish ions to hydrate, and these individual groups are highly polar. If such groups were asymmetrically distributed, molecules would result which had high dipole moments. On the othe hand, even the most polar of groups, if balanced by other polar groups, may comprise part of a molecule which as a whole is substantially non-polar. By symmetrically distributing around the molecule polar groups possessing ions which can hydrate, I theorize that a structure is formed which can rather readily hydrate or dehydrate, for its individual molecules are not drawn into tight, intermolecular orientation by polar effects.

Summarizing, molecular configurations are not easily or precisely established. However, a wide range of molecular shapes can be expected, depending on the general configuration and the type and placement of substituent groups, ranging from molecules in which the rings are almost planar (little bulkiness) to those in which the rings are highly non-planar (high bulkiness). Although not wishing to be bound by theory, it is believed that water of hydration moves in and out of molecular aggregates of the former molecules which can be tightly packed with considerably more difficulty than with the latter. Putting it another way, a relatively low driving force (such as low water vapor pressure) is adequate to move water to the alkali metal ions of an open structure salt, everything else being equal, as compared with a tight structure.

The best compounds that are birefringent at a first relatively humidity and non-birefringent at a second relative humidity are alkali metal salts of 3,3',4,4'-benzophenone tetracarboxylic dianhydride and alkali metal salts of 1,1,3-trimethyl- 5-carboxy-3- (p-carboxyphenyl) indan. The molecular structure of each is given below along with the approximate relative humidity at which certain alkali metal salts thereof become birefringent:

Alkali Metal Salts of 1,1,3-Trimethyl-5-carboxy-3-(p-carboxyphenyl) Indan

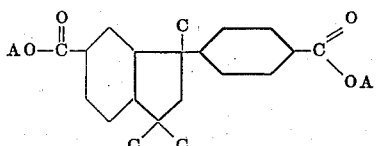

where A = an alkali metal
Relative Humidities of the Alkali Metal Salts:
$Li_2$ salt = 74 percent
$Na_2$ salt = 62 percent
$K_2$ salt = 53 percent
$Rb_2$ salt = 45 percent Alkali Metal Salts of 3,3'4,4'Benzophenone Tetracarboxylic Dianhydride

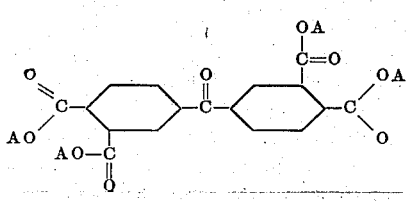

where A = an alkali metal
Relative Humidities of the Alkali Metal Salts:
$Li_4$ salt = 68 percent
$Na_4$ salt = 57 percent
$K_4$ salt = 43 percent
$Rb_4$ salt = 20 percent In general the alkali metals include sodium and potassium which are preferred for convenience and economy, as well as lithium, rubidium and cesium.

Although not as good as the above described alkali metal salts of the indan and benzophenone compounds, a preferred composition is the alkali metal salts of napthochrome green, the disodium salt thereof being birefringent at a relative humidity of about 84 percent.

Other suitable compositions are alkali metal salts of 1,1' binaphthyl 8—8' dicarboxylic acid. The $Na_2$ salt begins to display birefringence at about 53 percent relative humidity at 70° F. The sodium salt was stroked to induce crystallization and after repeated cycling, the birefringence tended to become irreversible. The $K_2$ salt did not crystallize so that there was no observation.

Other suitable compositions are alkali metal salts of benzophenone 4,4'-dicarboxylic acid, the sodium salt beginning birefringence at about 96 percent relative humidity, the potassium salt beginning birefringence at about 85 percent and the rubidium salt beginning at about 75 percent.

The following list contains suitable alkali metal salts of compounds that were tested and indicates the approximate temperature in °F. below which the alkali metal salt is birefringent:

| Compound | Alkali Metal | Temperature °F. | Remarks |
|---|---|---|---|
| 3,3-Bis-(4-hydroxyphenyl) oxindole | $K_2$ | 254 | Was stroked to induce birefringence which became irreversible after a few cycles. |
| 2,4' Benzophenone dicarboxylic acid | $K_2$ | 176 | Glassy film first forms (non-birefringent) which subsequently crystallizes, making observation possible. |
| o-Benzoyl benzoic acid | K | | |
| | Na | 300 | No dehydration at 300° (no cessation of birefringence) |
| | Rb | | No dehydration at 300° (no cessation of birefringence) Films difficult to observe because glassy film crystallizes with difficulty. Considerable background birefringence present with K salt above 300°F. |
| 2,4,4'-Trihydroxy benzophenone | $K_3$ | 200 | Required thin film for dehydration to occur. |
| 2-Hydroxy-4,-methoxybenzophenone-5-sulfonic acid | $K_2$ | 275 | No stroking required to induce birefringence. |
| 2-Hydroxy-4-methoxybenzophenone | K | 122 | Stroking required to induce birefringence of film. |
| 2,2'-Dihydroxy-4,4' dimethoxy benzophenone | $K_2$ | 250 | |
| 2-(-hydroxybenzoyl)-Benzoic acid | $K_2$ | 221 | |
| 2,2' Dihydroxy benzophenone | $K_2$ | 250 | |
| o-Hydroxybenzophenone | K | 113 | |
| 4,4' Dihydroxybenzophenone | $K_2$ | 260 | |
| Chlorobenzoyl benzoic acid | K | 290 | Tends to form considerable background birefringence on cycling. |
| 2,4 Dihydroxybenzophenone | $K_2$ | | No dehydration (no cessation of birefringence at 300°F. |
| Sodium 2,2'-dihydroxy-4,4'-dimethoxy-5-sulfobenzophenone | Na | | No cessation of birefringence at 300°F. |
| | $NaK_2$ | | No cessation of birefringence at 300°F. |

| Compound | Salt | Temp (°F) | Observations |
|---|---|---|---|
| 2,2',4,4'-Tetrahydroxy benzophenone | $K_4$ | | No dehydration (no cessation of birefringence at 300°F.) |
| Phenol red | K | 150 | |
| p,p' Bisphenol | $K_2$ | 290 | Thin layers required for dehydration and cessation of birefringence. Residual birefringence persists after major dehydration. |
| o,o' Biphenol | $K_2$ | 194 | No dehydration (no cessation of birefringence apparent at 300°F.) |
| 2,2' Diphenic acid | $Rb_2$ | 240 | |
| | $K_2$ | | No dehydration (no cessation of birefringence at 300°F.) |
| 4-Biphenylcarboxylic acid | K | | No dehydration (no cessation of birefringence at 300°F.) |
| 1,1'-Bi-2-naphthol | $K_2$ | | No dehydration (no cessation of birefringence at 300°F.) |
| 4,4' Biphenyldisulfonic acid | K | | No dehydration (no cessation of birefringence at 300°F.) |
| | $Rb_2$ | | No dehydration (no cessation of birefringence at 300°F.) |
| Phenolphthalein | K | 169 | In conc. soln. approx. 100% more KOH required than theo. for $K_3$ salt to form salt capable of birefringence. Even then stroking of film required to align molecules and so develop birefringence. |
| Bisphenol A | $K_2$ | 266 | Tended to gradually form birefringent crystals which would no longer dissociate on heating. |
| Bishydroxy coumarin, (3,3'-methylenebis [4-hydroxy coumarin]) | $K_2$ | 150 | |
| | $K_4$ | 150 | |
| Methylene disalicyclic acid | $K_2$ | 255 | Tended to form glassy film |
| | $K_4$ | 255 | |
| Benzilic acid | K | | No dehydration at 300°F. |
| | Rb | | Strong crystal formation of high birefringence. |
| Diphenyl acetic acid | K | 290 | Slow dehydration with strong residual background birefringence. |
| Dichlorophene [2,2'-methylenebis-(4-chlorophenol)] | $K_2$ | | No dehydration at 300°F., i.e., no cessation of birefringence. Highly crystalline birefringent film. |
| 6,6 Bis-(p-hydroxy-phenyl)-3-(1-hydroxy 1-methyl ethyl)-heptanoic acid gamma lactone | $K_3$ | | No dehydration at 300°F. |
| Hexachlorophene, [2,2' methylenebis-(3,4,6-trichloro-2-hydroxyphenyl) methane] | $K_2$ | | No hydration at 300°F., i.e., no cessation of birefringence. |
| Diphenolic acid | $K_3$ | | No dehydration at 300°F., i.e., no cessation of birefringence. |
| Pamoic acid | | | When both —COOH or both —COOH plus-both —OH's neut., no dissociation observed at 300°F., i.e., no cessation of birefringence. Salts tended to form glasses which crystallized with great difficulty. |
| 2,6-Divanillylidenecy-clohexanone | $K_2$ | 254 | |
| 4',5,7-Trihydroxy flavenone | $K_3$ | | No dehydration (no cessation biref.) at 300°F. |
| 4,4' Oxydiphenol | $K_2$ | | No dehydration (no cessation biref.) at 300°F. |
| 2,2'-Thiobis (4,6-dichlorophenol) | $K_2$ | 290 | Heavy residual birefringence after 290° reached. |
| 2,2' Dithiodibenzoic acid | $K_2$ | | No crystallization. |
| | $Na_2$ | 230 | Crystallization only slowly occurring. Heavy residual birefringence after 230°F. reached. |
| dihydroxy-diphenyl sulfone | $K_2$ | 240 | Residual birefringence after 240°F. reached. |
| 5,5 Thiodisalicyclic acid | $K_2$ | | No dehydration (no cessation birefringence at 300°F. |
| | $K_4$ | | Same as $K_2$ Salt. |

There is another factor having to do with the choice of molecular configurations which is of importance in the design of R.H.- or temperature-sensors having maximum industrial utility. As noted before, it is believed that the substituent groups contribute to positioning the rings in bulky, open configurations, the degree of bulkiness depending in part on the substituents. However, though the molecules may be unorganized when dissolved in the solution from which they are to be deposited, powerful intermolecular forces come into play as water evaporates and the molecules are forced more closely together. Observation suggests that some molecules of the type found effective are able to totally resist being forced into close, tight molecular groupings during evaporation of water. For the dehydrated material shows no birefringence after thousands of dehydration-hydration cycles. Other molecules, however, develop what might be termed a "background-haze," a partial birefringence in the dehydrated form when observed in polarized light. Sometimes this haze develops immediately, sometimes it develops on repetitive cycling through the phases of "dehydrated solid/hydrated solid/dehydrated solid."

It is through that this haze develops because a small proportio of the molecules succumb to intermolecular organizing forces since the rings have a considerable degree of rotational freedom in spite of the effect of the substituent groups. Thus, chance may bring some molecules into a tightly organized, birefringent microcrystal which is not readily disrupted even by deliquescence. As noted before, some molecular structures are entirely free of this hazing tendency and these are preferred for use in indicating devices. For though the presence of background haze does not prevent those compounds from being used as indicators, the effect is more dramatic when the field changes from blue-black to great brilliance or vice versa.

This tendency of certain molecular species to succumb to organizational forces and so pass from the isotropic to the birefringent state under particular conditions may be put to valuable industrial use. In particular, it has been found that some species (for example, the alkali salts of 1,1,3-Trimethyl-5-carboxy-3-(p-carboxyphenyl) indan as recorded in Table 1) are highly stable in the anhydrous (or minimum hydration) state, which is characterized by its isotropic nature when viewed between crossed Polaroids. However, when the ambient R.H. passes the critical level at which the compound hydrates and becomes birefringent, organizational forces begin to operate. In a very limited time, varying from a few hours to a couple of days, a new essentially irreversible birefringent crystal structure develops. Thus, even though the R.H. subsequently drops below the critical R.H. at which birefringence originally began, the film remains permanently birefringent.

This "memory" feature of certain molecular structures is invaluable. For, as noted elsewhere, there are many industrial areas where cyclical changes in R.H. occur and where it is desired that critical humidities (as that at which fungi development begins) are not exceeded. The compounds just described are excellent as inexpensive visual alarms, inactive indefinitely below the critical R.H., but ready to respond promptly and to hold their message for the next viewing observer.

There is another factor besides the intrinsic bulkiness of the cyclic organic structures which affects the openness of the final film. This has to do with the bases selected to neutralize acidic molecules. For since the atomic volumes and structures of the different cations selected to combine with the organic molecules described vary, the spatial arrangement of the total molecules of which they come to comprise a part also is affected. This in turn modifies how the molecules join other similar molecules to form a macro-structure. Thus, various cations may be selected depending on the nature of the opposite ion of high bulkiness and complexity. By judicious selection of anions and cations, compounds can be prepared which hydrate and dehydrate with varying degrees of ease. This, in turn, means that substances are available for use as sensitive agents to indicate visually, when the compounds are deposited on suitable substrates and viewed with polarized light, the existence of various relative humidity levels or temperatures.

At a certain temperature, what decides whether a particular compound gains or loses water is the pressure of water vapor around the molecule. Most hygrometers are used within a relatively narrow temperature band of perhaps 40° to 95° F. in areas where the R.H. is relatively high. Thus, structures are needed in which the water of hydration is loosely bound. Suitable compounds are shown in Table 1, together with the % R.H. at which birefringence begins if the R.H. is rising, or terminates if the R.H. is dropping, in the case of low mass deposits of the type used in these sensors. Since the alkali metals form isomorphous series of compounds, the R.H. response of the particular hygrometric series is controlled by using varying mol ratios of alkali metals as the cations.

TABLE 1

Birefringent, Labile Hydrates Having Sequential R.H. Response

| R.H. at which birefringence begins | Anion | Cation A/B | Mol % Cation A Mol % Cation B |
|---|---|---|---|
| 74.26 | 1,1,3-Trimethyl-5-carboxy-3-(p-carboxyphenyl) indan | Li/— | 100 |
| 71.7 | " | Li/Na | 75/25 |
| 70.2 | " | Li/Na | 50/50 |
| 67.2 | " | Li/Na | 25/75 |
| 63.1 | " | Na/— | 100 |
| 62.5 | " | Na/K | 75/25 |
| 60.6 | " | Na/K | 50/50 |
| 57.6 | " | Na/K | 25/25 |
| 53.2 | " | K/— | 100 |
| 50.7 | " | K/Rb | 75/25 |
| 49.5 | " | K/Rb | 50/50 |
| 47.3 | " | K/Rb | 25/75 |
| 45.1 | " | Rb/— | 100 |
| 69.4 | 3,3',4,4' Benzophenone Tetracarboxylic Dianhydride | Li/— | 100 |
| 67.5 | | Li/Na | 75/25 |
| 66.0 | | Li/Na | 50/50 |
| 62.5 | " | Li/Na | 25/75 |
| 58.6 | " | Na/— | 100 |
| 55.9 | " | Na/K | 75/25 |
| 53.2 | " | Na/K | 50/50 |
| 49.8 | " | Na/K | 25/75 |
| 43.0 | " | K/— | 100 |
| 39.1 | " | K/Rb | 75/25 |
| 32.2 | " | K/Rb | 50/50 |
| 25.0 | " | K/Rb | 25/75 |
| 18.0 | " | Rb/— | 100 |

Industrially, besides the need for simple hygrometers, there is a need for simple, visual thermal indicators which can be of large surface area for high recognition value. These indicators may be used to guard thermally-sensitive equipment, to indicate through a viewing aperture the temperature of gases in spaces such as ducts and environmental rooms, to indicate temperature distribution over relatively large areas as in the design of electric irons and hotplates, etc. Such indicators and alarms are usually required to operate at somewhat elevated temperatures, in particular above 100° F. For such applications, indicating compounds are desired in which the water is relatively tightly bound since the pressure of water vapor in open air which has been heated to a high temperature is quite low. The rapid drop in R.H. as the temperature is raised is shown in Table 2.

TABLE 2

% Relative Humidity vs. Air Temperature (70 grains moisture/lb. dry air)

| Temp., °F. | % R.H. | Temp. °F. | % R.H. |
|---|---|---|---|
| 70 | 65 | 150 | 6 |
| 80 | 46 | 160 | 5 |
| 90 | 34 | 170 | 4 |
| 100 | 25 | 180 | 3 |
| 110 | 18 | 190 | 2.5 |
| 120 | 14 | 200 | 2.0 |
| 130 | 10 | 210 | 1.6 |
| 140 | 8 | 220 | 1.4 |

Essentially, because of the relatively broad limits which typify simple alarm systems, the ambient relative humidity, which indicates the vapor pressure of water (or the back-pressure which is operating to prevent the hydrate from dissociating), can be considered as a constant at relatively high temperatures. Thus, one can measure the temperature at which various hydrates cease birefringence with the knowledge that variations of ambient R.H. (at room temperature) will have little effect on the temperature at which birefringence ceases. Table 3 lists various compounds together with the temperature at which birefringence ceases.

TABLE 3

Compounds and Temperature at Which Birefringence Ceases

| Compounds Potassium salts of: | Temp., °F. |
|---|---|
| o-Hydroxybenzophenone | 113 |
| 2-Hydroxy-4-methoxy-benzophenone | 122 |
| Phenol red | 151 |
| 2,4' Benzophenonedicarboxylic acid | 176 |
| o,o'-Biphenol | 194 |
| 2-(p-Hydroxybenzoyl)-benzoic acid | 221 |
| 2,2'-Dihydroxy-4,4'-dimethoxy-benzophenone | 250 |
| o-Benzoyl benzoic acid | 300 |

Other compounds may be used advantageously in assembling a suitably responsive series. Among the compounds whose alkali metal salts are appropriately responsive at various temperatures are the following:

p,p Biphenol
2,2' Diphenic acid
Phenolphthalein
Bisphenol A
Bishydroxycoumarin
Methylene disalicylic acid
2,4,4'-Trihydroxy-benzophenone
2,2' Dihydroxybenzophenone
4,4' Dihydroxybenzophenone
2-Hydroxy-4-methoxy-benzophenone-5 sulfonic acid
3,3-Bis-(4-hydroxyphenyl)-oxindole
2,6-Divanillylidenecyclohexanone These labile compounds can also perform the industrially useful task of serving as detectors of various types of radiation. Thus, either pure compounds or those compounded with dyestuffs, for example, to make them highly absorbent to a selected band of radiation, can serve as radiation detectors. Further, to increase the sensitivity the compounds may be mounted on substrates which absorb the radiation to be visually detected.

A wide variety of materials absorb acoustical and electromagnetic radiation of various wavelengths. Usually a portion of the absorbed radiation is converted to kinetic energy resulting in a rise in temperature of the material and its surroundings. Infra red heating panels and microwave heating ovens typify industrial applications of varying radiation bands. As part of the intelligent application of various types of radiation, it is desirable to rapidly determine the distribution of radiation, whether it is emanating directly from an infra red panel or an ultrasonic cleaning tank transducer, or perhaps is emitting from a distant radiation source and focused by a radiation-transmitting lens. For such detection large, easily observed radiation detection panels are most useful. Very much as with a humidity sensor, birefringent, highly labile hydrates may be disposed on a suitable substrate between crossed polarizers. As the compounds and/or substrate absorb radiation, the temperature of the materials and the overlying gas rises with an accompanying dissociation of the hydrates and cessation of birefringence. To make the system more sensitive, the polarizing sheets, sensitive compound, and substrate may comprise a sealed system. The R.H. of the encapsulated gas is preferably selected to be close to the critical humidity at which birefringence ceases at the ambient temperature of operation. Thus, only a small amount of absorbed radiation will cause a temperature rise, reduction of the R.H. of the gas, evaporation of the water of hydration and cessation of birefringence. Less sensitive than the system described is one based on the appearance of birefringence in compounds which had ceased birefringence because they had deliquesced.

Many variants of these practices are possible, of course. Thus, referring to FIG. 1 again, flexible substrate 2 on which is deposited crystal layer 3 might be in roll form so that the hydrated crystal layer and substrate might unroll under and close to a heated, laterally-moving stylus in a recording instrument. Thus, a narrow line of non-birefringent, dehydrated crystals would form under the heated stylus. On passing between polarizer 1 and analyzer 4 a "curve" would be observed to have been drawn by the stylus. This curve will be permanent if th substrate/crystal is stored below a certain critical R.H. But the curve may be obliterated and the film used again by simply exposing the film to a high humidity to rehydrate the previously dehydrated crystals.

For use in the applications described I have discovered a vital type of addition agent for compounding with the materials described. This type of agent includes a number of inorganic compounds of high surface area having little or no intrinsic birefringence. When these materials are added to solutions of th active organic compounds already described, a new sensitivity to changes of humidity is observed in the dried droplets or films deposited from such suspensions. This is of great industrial importance since it is often essential to rapidly ascertan shifts in R.H. Indeed, many mechanical R.H. meter manufacturers state the time in which their devices will move a certain proportion of the way toward a new R.H. reading when the R.H. has shifted. Using these high surface area agents, only a few seconds are required for a sensor film to come to a new equilibrium when the R.H. has shifted. Further, much higher driving force (lower R.H.) is required to dehydrate the films so that birefringence ceases if the high surface area agents are not used. Table 4 shows graphically the new sensitivity contributed by these agents.

TABLE 4

% R.H. at Which Birefringence Ceases (Due to Dehydration) When High Surface Area Compounding Agents Are Used ($Rb_2$ Phenylindan Dicarboxylate is R.H.-sensitive Compound)

| Compounding Agent | Agent Area M./gr. | gr. Agent/ 1 gr. Rb Salt | % R.H. Birefringence Ceases |
|---|---|---|---|
| None | — | — | 42.7 |
| Diatomaceous Earth | Relatively Low | 1.00 | 43.0 |
| Pyrogenic Silica | 200 | 0.30 | 45.2 |
| Pyrogenic Alum. Oxide | 100 | 0.60 | 45.2 |
| Pyrogenic Mixed Silica/ Alum. Oxide (14% $Al_2O_3$) | 150 | 0.45 | 46.0 |
| Precipitated Silica | 370 | 0.16 | 46.0 |
| Pyrogenic Mixed Silica/ Alum. Oxide (1.3% $Al_2O_3$) | 50 | 1.20 | 51.5 |
| " | 80 | 1.00 | 51.5 |
| " | 170 | 0.50 | 51.5 |

These same compounding agents are additionally useful in that they render the thickness of the deposited sensitive film non-critical. Some types of molecular structures, when deposited in a pure, uncompounded form in thick layers, have been observed to continue in the birefringent mode when hydrated, even though the humidity was subsequently reduced far below the point at which they should have given up their water. The great thickness (compared with molecular dimensions) apparently stabilizes the system. Use of high surface area compounding agents reduced or eliminated this phenomenon of thickness-dependency. It is theorized that the sensitive molecules distribute themselves over the high surface of the added solids so that, in effect, two-dimensional structures are exposed to the air.

Earlier I stated that there are two basic types of compounds which are useful as the active agents in temperature- or R.H.-sensitive devices. I have now described the first type and the structures required in detail. The second type which is equally useful has already been mentioned. I includes those compounds which are birefringent in th solid state and which deliquesce so that the birefringent crystals cease birefringence due to solution once a critical R.H. has been exceeded. In particular, I have found that the materials which are suitable for use as indicators are those chemical compounds which form birefringent crystals and whose saturated solutions have vapor pressures between 1.0 and 17.5 mm. of mercury at 68° F.

I have further found that those same substances which have little or no birefringence but which possess high surface area are highly useful agents when used with the second type of compound. For once again they greatly improve the sensitivity of the materials to small changes in R.H. As before, they are advantageously mixed with the solution of the sensitive compound before it is deposited on a substrate.

As before, I choose to deposit the active materials in layers, droplets, channels and interstices so that the thickness of the layer does not greatly exceed about 0.1 mm and preferably does not exceed about 0.05 mm. This then insures adequate brilliance of the visual display yet minimizes the time lag due to the diffusion of water into or out of the indicator layer or particles. In general, the thickness of the coating containing the birefringent composition should be at least about 0.001 millimeter and preferably is at least about 0.005 mm.

In use, as the R.H. rises a particle of deposited material absorbs water and finally dissolves. As the R.H. continues to rise the droplet of solution increases in volume but maintains its structural integrity and location on the substrate. As the R.H. decreases, water is given up by the droplet and at the key point birefringence appears again. Thus, when such droplets are disposed for viewing in a polarized light field, they comprise an effective R.H. indicator. A series of compounds may be selected whose birefringence terminates due to dissolution as the R.H. increases. Thus, a typical series can be prepared from the following compounds:

TABLE 5

| % R.H. | Compound |
| --- | --- |
| 30 | Potassium Salt of Levulinic Acid |
| 40 | Potassium Salt of Phthalic Acid |
| 50 | Potassium Salt of Succinic Acid |
| 60 | Potassium Salt of Adipic Acid |
| 70 | Potassium Salt of 1,2,4,5 Benzenetetracarboxylic Acid |
| 80 | Potassium Salt of Fumaric Acid |
| 90 | Potassium Salt of o-Benzoyl Benzoic Acid |

This happens to be a series of potassium salts, but many other compounds may be used, depending on the R.H. range to be covered. Table 6 shows another series of suitable chemical compounds, selected from sodium and potassium salts for reasons of economy and availability.

TABLE 6

| % R.H. | Compound |
| --- | --- |
| 35 | Dipotassium Salt of Tetrahydrophthalic Acid |
| 40 | Potassium Salt of Crotonic Acid |
| 46 | Dipotassium Salt of Maleic Acid |
| 50 | Sodium Salt of 4-Chlorophthalic Acid |
| 60 | Dipotassium Salt of Azelaic Acid |
| 65 | Tetrasodium Salt of 1,2,4,5 Benzenetetracarboxylic Acid |
| 73 | Potassium Salt of Glyoxylic Acid |
| 85 | Sodium Salt of Anthranilic Acid |
| 90 | Disodium Salt of Adipic Acid |

Various chemical compounds may be mixed in varying ratios to form mixed crystals which span different ranges from what might be secured if only pure compounds were used. Inorganic compounds such as sodium nitrate may be used, of course, for R.H.-indication as well as organic compounds.

Various additives may be included in the salt solutions to be applied to the carrier substrates. Dyestuffs may be desired to give a particular color to the crystals for purposes of attracting attention. Antifoaming agents may prove useful in minimizing foaming during application of the surface tension salt solutions to the substrate. Various types of thickeners can be helpful, too, in giving a salt solution sufficient viscosity to allow easy "printing" onto appropriate substrates. In this latter case, especially, a material is generally selected — such as an inorganic silicate — which has no birefringence. Thus, the field stays blue-black until crystallization of the sensitive compound occurs. In some instances the thickener may be bifunctional, both thickening the solution and presenting a high surface area to increase sensitivity to R.H. change as discussed elsewhere.

As another method of applying this invention, as shown in FIG. 6, it is possible to disperse droplets of solutions of R.H.-sensitive compounds of the type described in non-aqueous vehicles of the type called lacquers and varnishes. These vehicles may then be applied to suitable substrates where, on evaporation of the non-aqueous solvent, the droplets remain encapsulated in the solidified vehicle. If vehicles are chosen having the proper moisture transmission characteristics, the encapsulated may, for example, loose its water to form birefringent crystals at suitably low R.H.s. As the R.H. rises, the crystals may then draw moisture into the droplet cavity to deliquesce and cease birefringence. Such coated substrates may be placed between polarizing elements to form hygrometers of the type described elsewhere.

The preparation of the highly preferred alkali metal salts of the 1,1,3-trimethyl-5-carboxy-3-(p-carboxyphenyl) indan compound and the 3,3',4,4'-benzophenone tetracarboxylic dianhydride compounds will be described.

To form the indan acid, an appropriate hydrocarbon can be partially oxidized by air oxidation as described in the Towle and Baldwin article "Make Most Aromatic Acids Using Mid-Century Oxidation Process,"

Hydrocarbon Processing, 43 (11), 149 (1964) or by chromic anhydride oxidation as described in an article by Ipatieff et al, J. Am. Chem. Soc., 70, 2123 (1948). The Ipatieff et al. article describes a general procedure for the preparation of a suitable appropriate hydrocarbon by reacting an olefin such as trimethylethylene with p-cymene in the presence of sulfuric acid or hydrogen fluoride catalysts. U.S. Pat. No. 3,102,135 describes the production of 1-(carboxyphenyl) indane carboxylic acids and this patent, as well as the Towle et al. and Ipatieff et al. articles, are incorporated by reference.

The preparation of 3,3',4,4'-benzophenone tetracarboxylic dianhydride is described in U.S. Pat. No. 3,078,279 and U.S. Pat. No. 3,297,727 describes methods of obtaining relatively pure benzophenone dianhydride. These patents are incorporated by reference.

In general carboxy substituted diaryl ketones can be prepared from diarylmethanes such as para ditolyl methane by oxidation thereof with air at an elevated temperature and pressure, for example, 90° C. and 45 pounds per square inch gauge, to obtain benzophenone 4,4'-dicarboxylic acid as described in McCracken et al. U.S. Pat. No. 3,075,007. A variety of diarylketone carboxylic acids may be prepared by subjecting to oxidation with nitric acid having an initial concentration of about 5 to about 70 percent, at a temperature of about 110° to 350° C. for about one minute to 48 hours a 1,1-diarylalkane represented in general by the following structural formula:

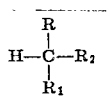

wherein R and $R_1$ are aryl groups carrying as nuclear substituents alkyl radicals having from one to eight carbon atoms and $R_2$ is an alkyl radical having from one to eight carbon atoms, the molar ratio of said nitric acid calculated as 100 percent nitric acid, to said diaryalkane being about 8.0 to about 17.0.

The preparation of the alkali metal salts of the previously mentioned benzophenone dianhydride and the benzophenone 4,4'-dicarboxylic acid follows.

PREPARATION OF THE LITHIUM AND POTASSIUM SALTS OF CARBOXY SUBSTITUTED DIARYL KETONES

EXAMPLE I 27.0 grams of benzophenone 4,4'-dicarboxylic acid was agitated in 200 grams distilled water to give a smooth slurry. To this was added 8.4 grams lithium hydroxide monohydrate dissolved in 50 grams distilled water. While agitating, the mass was warmed to 150° F. and held until the suspended material had reacted to form a clear solution of the di-lithium salt, normally about 15 minutes. The solution was then filtered through No. 40 filter paper to remove any traces of dust, etc. and cooled. The solution could be used in this form as a coating agent for glass, cellulose triacetate, polymethylmethacrylate or similar substrates in order to form an R.H.-responsive film after drying. Or if a more sensitive final film was desired (as described elsewhere), to the filtered solution 17.0 grams of a suitable inorganic compound having a high surface area, as for example a pyrogenic silica, was added and dispersed. A high-shear mixer such as a Waring Blender is suitable for dispersion of the silica. The thickened salt solution can then be used as a coating agent just as the clear filtered solution an be.

EXAMPLE II 35.8 grams of benzophenone 3,3',4,4'-tetracarboxylic acid (or 32.2 grams of benzophenone 3,3',4,4'-tetracarboxylic dianhydride) was agitated in 400 grams of distilled water to give a smooth slurry. To this was added 22.4 grams potassium hydroxide dissolved in 50 grams distilled water. While being agitated the suspension was warmed to 150° F. and held until the acid (or anhydride) had reacted to form a solution of the tetra-potassium salt. This takes 10–15 minutes. The solution was then filtered through No. 40 filter paper to remove any traces of insoluble impurities.

The preparation of the alkali metal salts of the previously described indan compound is illustrated by the example that follows:

PREPARATION OF THE SODIUM SALT OF PHENYLINDAN DICARBOXYLIC ACID

EXAMPLE III 32.4 grams of 1,1,3-trimethyl-5-carboxy-3-(p-carboxyphenyl) indan was agitated in 300 grams distilled water to give a smooth suspension. To this was added 8.0 grams sodium hydroxide dissolved in 30 grams distilled water. While being stirred the suspension was warmed to 150° F. and held approximately 15 minutes while the acid reacted to form the di-sodium salt. The solution was filtered through No. 40 filter paper to give a clear solution ready for coating onto suitable substrates to form an R.H.-responsive film.

Other alkali metal salts including the rubidium and cesium salt can be prepared in place of the particular lithium, potassium or sodium salt illustrated in Examples I, II and III. Substantially equivalent results can be obtained with such alkali metal salts.

As previously indicated and as seen in the examples, the chemical composition that of itself senses changes in relative humidity generally having at least two rings which carbocyclic rings preferably comprising one fused ring structure and one benzene ring as found in the preferred indan salts such as the alkali metal salts of 1,1,3-trimethyl-5-carboxy-3-(p-carboxyphenyl) indane or other suitable salts such as the alkali metal salts of naphthochrome green or 1,1'-binaphthyl 8,8'-dicarboxylic acid. In the preferred dianhydride salts, the compound contains at least two benzene rings as the preferred ring structures such as found in the alkali metal salt of 3,3',4,4'-benzophenone tetracarboxylic dianhydride.

What is claimed is:

1. A visual-type hygrometer comprising (1) a source of illumination providing a light beam, (2) means for providing observable changes in relative humidity comprising a chemical composition that of itself senses changes in relative humidity, the composition being abruptly triggered at a predetermined relative humidity level from an anisotropic and translucent transmission state characteristic of the first relative humidity immediately contiguous to the predetermined relative humidity level to an isotropic and clear state characteristic of the second relative humidity, (3) light detecting means for detecting observable changes in the brightness and intensity of the light coming from the composition when the light beam contacts the composition, the light from the composition at the first relative humidity being of sufficient brightness and intensity to provide a visual signal at the first relative humidity but not at the scond relative humidity.

2. A device as defined in claim 1 in which the composition is birefringent at the first relative humidity when hydrated and non-birefringent at the second relative humidity when less hydrated.

3. A device as defined in claim 1 in which the composition is birefringent at the first relative humidity when solid and non-birefringent at the second relative humidity when liquid.

4. A device as defined in claim 1 in which the means for providing observable changes includes means to intensify observable changes comprising a polarizer for polarizing the light beam and an analyzer for analyzing the beam, the light beam traveling through the device by going through the polarizer and the polarized light passing through the composition that doubly refracts the beam when birefringent at the first relative humidity to pass the beam on through the analyzer.

5. A device as defined in claim 1 in which the composition is translucent at the first relative humidity and transparent at the second relative humidity.

6. A device as defined in claim 5 in which the composition is translucent at the first relative humidity when hydrated and transparent at the second relative humidity when less hydrated.

7. A device as defined in claim 5 in which the composition is translucent at the first relative humidity when solid and transparent at the second relative humidity when liquid.

8. A device as defined in claim 1 in which the means for providing observable changes includes means for illuminating the composition which when translucent at the first relative humidity provides light of sufficient intensity and brightness to provide a visual signal.

9. A device as defined in claim 1 in which the light detecting means includes electrical means responsive to the visual signal at the first relative humidity and non-responsive to the signal at the second relative humidity.

10. A device as defined in claim 9 in which the electrical means includes a photo-responsive solid state electronic device.

11. A device as defined in claim 9 in which there is electrical control means responsive to the electrical means that is responsive to the visual signal, the control means for controlling electrical power to activate an electrical circuit.

12. A hygrometer as defined in claim 1 in which the composition comprises a compound having at least two rings in its structure and at least one polar group whose alkali salts furnish ions to hydrate.

13. A hygrometer as defined in claim 12 in which the polar group is a member selected from the group consisting of hydroxyl, carboxyl and sulfonic radicals.

14. A hygrometer as defined in claim 1 in which the composition comprises a compound having at least two benzene rings in its structure and polar groups whose mixed alkali metal salts furnish ions to hydrate.

15. A method of measuring relative humidity with a visual-type hygrometer comprising the steps of: (1) providing a light beam from a source of illumination, (2) contacting with the light beam a chemical composition that of itself senses changes in relative humidity and that is anisotropic and translucent at a first relative humidity and isotropic and clear at a second relative humidity, (3) sensing changes in the light coming from the composition that are due to changes in relative humidity in which the light from the composition at the first relative humidity is of sufficient brightness and intensity to provide a visual signal at the first relative humidity but not at the second relative humidity.

16. A method as defined in claim 15 in which there is provided the steps of polarizing the light beam before contacting the composition, doubly refracting the polarized light beam at the first relative humidity when the composition is contacted, and analyzing the doubly refracted light beam passing through the composition.

17. A method as defined in claim 16 in which the composition is birefringent and doubly refracts the polarized beam at the first relative humidity when hydrated and does not doubly refract the polarized beam at the second relative humidity when less hydrated.

18. A method as defined in claim 16 in which the composition doubly refracts the polarized beam when solid at the first relative humidity and does not doubly refract the beam when in solution at the second relative humidity.

19. An electrical-type hygrometer device comprising optical means for moving a light beam through the device, means for polarizing the light beam, means for analyzing the light beam, a chemical composition that of itself senses changes in relative humidity, the composition doubly refracting the light beam at a first relative humidity to pass the light beam through the device, and not doubly refracting the beam at a second relative humidity so that the light beam does not pass through the device, and electrical means responsive to the passing of the light beam through the composition at the first relative humidity to provide an electrical response to a change in relative humidity.

20. A device as defined in claim 19 in which there is provided electrical control means for controlling electrical power to activate an electrical circuit, the electrical control means being responsive to the light-detecting electrical means.

21. An electrical-type hygrometer comprising: (1) a source of illumination providing a light beam, (2) means for providing observable changes in relative humidity comprising a chemical composition that itself senses changes in relative humidity, the composition being anisotropic and translucent at a first relative humidity and isotropic and clear at a second relative humidity, and (3) light-detecting electrical means responsive to observable changes in the brightness and intensity of the light coming from the composition, the light coming from the composition at the first relative humidity being of sufficient brightness and intensity to provide a visual signal to activate the light-detecting electrical means.

22. A method of measuring relative humidity with an electrical-type hygrometer device comprising the steps of: (1) providing a light beam from a source of illumination, (2) contacting with the light beam means for providing observable changes in relative humidity, including a chemical composition that is responsive to changes in relative humidity and that is anisotropic and translucent at a first relative humidity and isotropic and clear at a second relative humidity, and (3) detecting changes in the light coming from the composition that are due to changes in relative humidity with light-detecting electrical means in which the light coming from the composition at the first relative humidity is of sufficient brightness and intensity to provide a signal.

23. A visual-type hygrometer comprising: (1) a source of illumination providing a light beam, (2) a chemical composition that of itself senses changes in relative humidity, the composition being birefringent at a first relative humidity and non-birefringent at a second relative humidity, (3) means to amplify observable changes in the composition due to changes in relative humidity including a polarizer for the light beam and an analyzer for the polarized beam that is passed through the composition, and (4) light detecting means for detecting changes in the brightness and intensity of light coming from the composition because of changes in relative humidity.

24. A hygrometer as defined in claim 23 in which the hygrometer is a transmission type in which the light beam passes through the polarizer and the polarized light beam passes through the composition, where it is doubly refracted at the first relative humidity, and the emerging refracted beam passes through the analyzer.

25. A hygrometer as defined in claim 23 in which the hygrometer is a reflective-type, the light beam passing through the polarizer and the chemical composition to a mirror and then being reflected back through the composition and the analyzer.

26. A hygrometer as defined in claim 23 in which the composition is located between the polarizer and the analyzer.

27. A hygrometer as defined in claim 23 in which the composition comprises an alkali metal salt of 1,1,3-trimethyl-5-carboxy-3-(p-carboxy phenyl) indan.

28. A hygrometer as defined in claim 23 in which the composition comprises an alkali metal salt of 3,3',4,4'-benzophenone tetracarboxylic dianhydride.

29. A hygrometer as defined in claim 23 in which the composition comprises an alkali metal salt of 1,1' binaphthyl 8-8' dicarboxylic acid.

30. A hygrometer as defined in claim 23 in which the composition comprises an alkali metal salt of naphthochrome green.

31. A hygrometer as defined in claim 23 in which the composition is a coating on a transparent substrate.

32. A hygrometer as defined in claim 23 in which the composition is a coating on a translucent substrate.

33. A hygrometer as defined in claim 23 in which the composition is a coating on a transparent or translucent substantially isotropic substrate.

34. A hygrometer as defined in claim 33 in which the thickness of the coating is at least about 0.01 milimeter.

35. A hygrometer as defined in claim 23 in which the composition includes an inorganic compound having a high surface area.

36. A hygrometer as defined in claim 23 in which at least two discrete areas which are adjacent in the same plane or optically spaced in parallel planes are occupied with compositions comprising a series of compounds or mixtures of compounds whose birefringence terminates at different relative humidities.

37. A hygrometer as defined in claim 36 in which the series of compounds includes potassium salts of levalinic acid, phthalic acid, succinic acid, adipic acid, 1,2,-4,5-benzenetetracarboxylic acid, fumaric acid and o-benzoyl benzoic acid.

38. A hygrometer as defined in claim 36 in which the series of compounds includes the dipotassium salt of tetrahydrophthalic acid, the sodium salt of 4-chlorophthalic acid, and the tetrasodium salt of 1,2,4,5-benzene tetracarboxylic acid.

39. A hygrometer as defined in claim 23 in which the polarizer is a circular-type and the polarized light beam passes through the composition to a mirror and is reflected back through the composition to the analyzer.

40. A method of measuring relative humidity by a visual-type hygrometer comprising the steps of: (1) providing a light beam from a source of illumination, (2) polarizing the light beam, (3) passing the polarized light beam through a chemical composition that of itself senses changes in relative humidity, the composition being birefringent at a first relative humidity and non-birefringent at a second relative humidity, (4) doubly refracting the light beam with the composition that is birefringent at the first relative humidity, but not doubly refracting the beam at the second relative humidity, (5) analyzing the doubly refracted light beam passing through the composition at the first relative humidity, and (6) observing the analyzed light beam of step (5) that is of sufficient brightness and intensity to provide a visual signal at the first relative humidity but not at the second relative humidity.

41. A visual-type hygrometer comprising a polarizer for a light beam, an analyzer for the light beam, and a chemical composition that refracts the light beam before being analyzed, the composition containing a compound that is responsive to changes in relative humidity by doubly refracting the light beam at a first relative humidity when hydrated and non-birefringent at a second relative humidity when less hydrated.

42. A hygrometer as defined in claim 41 in which the composition is adapted to undergo at least about 100 cycles of birefringence and non-birefringence.

43. A hygrometer as defined in claim 41 in which the composition is adapted to undergo at least one cycle from non-birefringent to birefringent but which becomes irreversibly birefringent if the birefringent state is maintained longer than approximately 72 hours.

44. A visual-type hygrometer comprising a polarizer for a light beam, an analyzer for the light beam, and a chemical composition that refracts the beam before being analyzed, the composition containing a compound that is responsive to changes in relative humidity, the compound being birefringent at a first relative humidity when solid and non-birefringent at a second relative humidity when in solution.

45. A hygrometer as defined in claim 44 in which the saturated solution of the composition has a vapor pressure in the range of about 1 to 17.5 mm of mercury at 68° F.

46. A hygrometer as defined in claim 44 in which the composition includes a potassium salt of o-benzoyl benzoic acid.

47. A hygrometer as defined in claim 44 in which a substrate containing at least two chemical compositions is located between the polarizer and the analyzer, a first chemical composition being birefringent at a first relative humidity and non-birefringent at a second relative humidity, and a second chemical composition that is birefringent at a third relative humidity and non-birefringent at a fourth relative humidity.

48. A method of measuring humidity by a visual-type hygrometer including a polarizer for a light beam and an analyzer for the light beam, the method comprising the steps of providing a chemical composition that refracts the light beam, the composition being responsive to changes in relative humidity by doubly refracting the light beam at a first relative humidity when hydrated and not doubly refracting the light beam at a second relative humidity when less hydrated, and passing the light beam, before being analyzed, through the chemical composition to doubly refract the beam at the first relative humidity to provide a visual indication of a change in relative humidity.

49. A method of measuring humidity by a visual-type hygrometer including a polarizer for a light beam, an analyzer for the light beam, and a chemical composition that refracts the beam being analyzed, the composition containing a compound that of itself senses changes in relative humidity, the compound being birefringent at a first relative humidity when solid and non-birefringent at a second relative humidity when in solution, the method comprising passing the light beam through the chemical comosition to doubly refract the beam at the first relative humidity, and passing the light beam through the chemical composition at the second relative humidity to not doubly refract the beam and provide visual indication of a difference in humidity between the first and second relative humidities.

* * * * *

UNITED STATES PATENT OFFICE
CERTIFICATE OF CORRECTION

Patent No. 3,776,038          Dated December 4, 1973

Inventor(s) STANLEY B. ELLIOTT

It is certified that error appears in the above-identified patent and that said Letters Patent are hereby corrected as shown below:

Patent claim 1, Column 20, line 54, change "hygrometer" to --humidity responsive device--;
Patent claim 12, Column 21, line 51, change "hygrometer" to --humidity responsive device--;
Patent claim 13, Column 21, line 55, change "hygrometer" to --humidity responsive device--;
Patent claim 14, Column 21, line 58, change "hygrometer" to --humidity responsive device--;
Patent claim 15, Column 21, line 64, change "hygrometer" to --humidity responsive device--;
Patent claim 19, Column 22, line 24, change "hygrometer" to --humidity responsive device--;
Patent claim 21, Column 22, line 42, change "hygrometer" to --humidity responsive device--;
Patent claim 22, Column 22, line 57, change "hygrometer" to --humidity responsive device--;
Patent claim 23, Column 23, line 3, change "hygrometer" to --humidity responsive device--;
Patent claim 24, Column 23, line 16, change "hygrometer" to --humidity responsive device--;
Patent claim 24, Column 23, line 17, change "hygrometer" to --humidity responsive device--;
Patent claim 25, Column 23, line 23, change "hygrometer" to --humidity responsive device--;
Patent claim 26, Column 23, line 27, change "hygrometer" to --humidity responsive device--;

Signed and sealed this 17th day of December 1974.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

Patent No. 3,776,038      Dated December 4, 1973

Inventor(s) STANLEY B. ELLIOTT

It is certified that error appears in the above-identified patent and that said Letters Patent are hereby corrected as shown below:

Patent claim 42, Column 24, line 32, change "hygrometer" to --humidity responsive device--;
Patent claim 43, Column 24, line 35, change "hygrometer" to --humidity responsive device--;
Patent claim 44, Column 24, line 40, change "hygrometer" to --humidity responsive device--;
Patent claim 45, Column 24, line 48, change "hygrometer" to --humidity responsive device--;
Patent claim 46, Column 24, line 52, change "hygrometer" to --humidity responsive device--;
Patent claim 47, Column 24, line 55, change "hygrometer" to --humidity responsive device--;
Patent claim 48, Column 24, line 63, change "hygrometer" to --humidity responsive device--;
Patent claim 49, Column 25, line 10, change "hygrometer" to --humidity responsive device--;

This certificate supersedes Certificate of Correction issued December 17, 1974.

Signed and sealed this 8th day of April 1975.

(SEAL)
Attest:

RUTH C. MASON
Attesting Officer

C. MARSHALL DANN
Commissioner of Patents
and Trademarks